United States Patent [19]

Schmidt

[11] Patent Number: 4,848,379
[45] Date of Patent: Jul. 18, 1989

[54] APPARATUS FOR AND METHOD OF CLEANING ROTATING PARTS OF PLASTICS PROCESSING MACHINES

[75] Inventor: Rudolf Schmidt, Munich, Fed. Rep. of Germany

[73] Assignee: Caroline Christ, abgasfreie Werkzeugreinigungsapparate für die Kunststoffindustrie, Munich, Fed. Rep. of Germany

[21] Appl. No.: 113,463

[22] Filed: Oct. 26, 1987

[30] Foreign Application Priority Data

Oct. 31, 1986 [DE] Fed. Rep. of Germany ....... 3637070

[51] Int. Cl.$^4$ ............................ B08B 1/00; B08B 7/00
[52] U.S. Cl. ............................................. 134/7; 134/8; 134/22.13; 134/30; 134/40; 134/107; 134/120; 134/159; 134/187
[58] Field of Search ................... 134/22.13, 29, 30, 40, 134/33, 7, 8

[56] References Cited

U.S. PATENT DOCUMENTS 3,071,458  1/1963  Kaskel .................................. 134/7
4,244,072  1/1981  Dunham et al. ....................... 134/8

*Primary Examiner*—Asok Pal
*Attorney, Agent, or Firm*—Henry M. Feiereisen

[57] ABSTRACT

A cleaning apparatus for removing synthetic residues from rotating parts of plastics processing machines includes a heatable tubular container which contains a dry powder or granular filling and is provided with an upper axial opening through which the part to be cleaned is introduced into the container. The part is clamped at its one end by a chuck which cooperates with a double-acting piston/cylinder unit so as to be movable upwardly and downwardly for introducing the part to be cleaned in the container and removing it therefrom after the cleaning cycle.

23 Claims, 1 Drawing Sheet

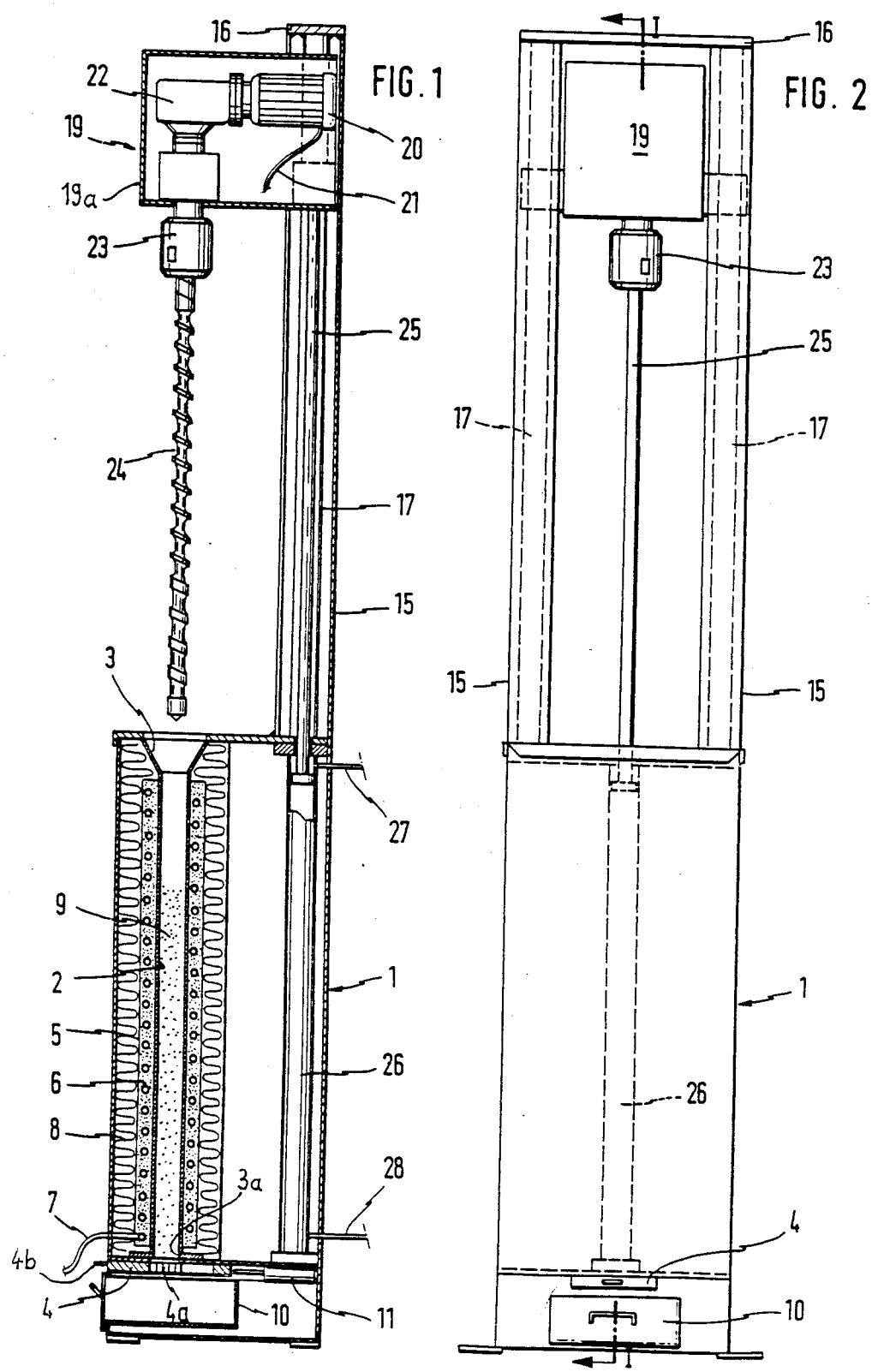

4,848,379

APPARATUS FOR AND METHOD OF CLEANING ROTATING PARTS OF PLASTICS PROCESSING MACHINES

BACKGROUND OF THE INVENTION

The present invention refers to a cleaning apparatus, in particular to a cleaning apparatus for removing adhering synthetic residues from rotating parts of plastics processing machines.

In general, those parts of plastics processing machines like injection molding machines or injection-blow molding machines, which are covered by residues of the processed plastic material are cleaned through heating by using a flame so either to burn off the plastics residues or/and simultaneously scrape off the softened synthetic residues. These methods result, however, in a deterioration of the surface coating of the parts to be cleaned.

In order to overcome this drawback and to avoid the formation of noxious decomposition products, the German Pat. No. DE-PS 31 46 478 discloses a cleaning apparatus including a heatable closed container which is filled with non-aggressive cleaning liquid and in which the parts to be cleaned are inserted. The cleaning action is attained by heating the liquid to or slightly above the melting point of the synthetic residue and simultaneously causing vibrations in the liquid.

The German Pat. No. DE-PS 33 09 878 discloses a similar apparatus which is especially designed for cleaning bulky parts like e.g. extrusion screws. The cleaning apparatus according to this prior art, however, requires considerable space and has a high electric connected load for the supply of the required powerful heating. A further drawback of this known cleaning apparatus is the long cleaning period because of the thermal inertia of the cleaning liquid and its possible need of a coolant connection.

SUMMARY OF THE INVENTION

It is an object of the invention to provide an improved apparatus for and improved method of cleaning in particular rotating parts of plastics processing machines obviating the afore-stated drawbacks.

This object and others which will become apparent hereinafter are attained in accordance with the present invention by filling a container with dry powder or granular material and immersing the rotating part to be cleaned within the dry material for a suitable period after heating the dry material to a predetermined temperature. The part to be cleaned is held in a clamping device which is movable toward the container to introduce the part therein and is moved in opposite direction to remove the part therefrom once the cleaning process has ended.

It was surprisingly found that rotating parts of plastics processing machines can be completely freed from adhering synthetic residues through a "dry" process if the parts are slowly immersed at constant rotational movement within the powder or granular material preheated to a suitable temperature in dependence on the respective synthetic material and of such graining and abrasiveness that the surface coating of the parts to be cleaned is not affected. The cleaning process is relatively wear resistant and free of exhaust gases. The demand on space is small because the inner diameter of the container only slightly exceeds the greatest diameter of the part to be cleaned and in contrast to the German Pat. No. DE-PS 33 09 878 there is no necessity to tilt the container.

A further advantage of the present invention is the shortening of the entire cleaning period as the used powder or granular material is of relatively low heat capacity and the part—once the cleaning process is over—can immediately be removed from the tubular container.

According to a further feature of the present invention, the powder or granules are preferably minerals or mixtures of minerals as hardened gypsum and hardened mortar or pumice granulates which in contrast to special cleaning liquids do not cause problems when being handled.

Preferably, the container is placed in upright position while the clamping device is arranged above the latter. In this manner, the powder or granules can easily be filled into and removed from the container.

According to yet another feature of the invention, the container is heated by an electric heating unit which includes a heating spiral embedded in a heating tube which surrounds the container and which in turn is enclosed by a heat insulation.

The clamping device includes a chuck which is connected to a reversible electromotor via a worm gearing for providing the required rotational movement. In order to attain a precise central alignment to the center axis of the tubular container, the clamping device is guided along a plurality of guide bars.

Advantageously, the opening of the container through which the part to be cleaned is introduced is of funnel-shape. As it was found, the synthetic residues accumulate in particular in the area of this opening so that the funnel-shaped design provides sufficient space for the separated synthetic residues and allows easy and convenient removal thereof.

BRIEF DESCRIPTION OF THE DRAWING

The above and other objects, features and advantages of the present invention will now be described in more detail with reference to the accompanying drawing in which:

FIG. 1 is a simplified schematic sectional side view of one embodiment of a cleaning apparatus according to the invention taken along the line I—I in FIG. 2; and FIG. 2 is a front view of the cleaning apparatus.

DESCRIPTION OF PREFERRED EMBODIMENTS

In the drawing, there is shown one embodiment of a cleaning apparatus usable especially for cleaning rotating parts like e.g. an extrusion screw of a plastic processing machine. The cleaning apparatus includes a box-shaped underframe or base 1 which is made of sheet steel and supports a tubular container 2 made preferably of special steel and extending substantially upright within the underframe 1. The container 2 is filled with a dry filling material like powder or granular material 9 and has an inner diameter which only slightly exceeds the greatest diameter of the part to be cleaned. At its one vertical end, the container 2 is provided with a funnel-shaped upper or top opening 3 and at its opposing vertical end with a lower or bottom opening 3a. The lower opening 3a is closable by a slider 4 which forms the bottom of the container 2 in its closing position and is suitable preferably made of special steel.

The container 2 is surrounded by an electric heating unit for heating the filling material 9 to a predetermined temperature. Suitably, the temperature is controlled by a thermostat which for ease of illustration is not shown in the drawing. In the present nonlimiting example the heating unit comprises a heating tube 5 which concentrically surrounds the container 2 essentially between the lower opening 3a and the funnel-shaped opening 3. Embedded within the heating tube 5 is an insulated heating spiral 6 which is connected to a not shown switch cabinet by a cable 7. Suitably, the switch cabinet may be integrated in the underframe 1. The heating tube 5 in turn is surrounded by a suitable heat-resistant insulation 8 which is preferably made of rock wool.

Depending on the volume of the part to be cleaned, the granular material 9 is introduced through the upper opening 3 into the container 2 up to a suitable height. Preferably, the granular material 9 is slightly abrasive and sufficiently heat-proof and may be a mixture of hardened gypsum with hardened mortar or pumice granulates. The mean graining of the mixture or granulates is approximately 0.5 mm to about 4 mm.

As shown in FIG. 1, the slider 4 is suitably supported between the container 2 and a subjacent collector 10 and is provided in the area of the lower opening 3a with a sieve-like perforation 4a which allows dusty fractions of the granular material 9 to be continuously discharged into and accumulated within a subjacent collector 10 during the cleaning cycle when the opening 3a is closed by the slider 4. If it becomes necessary to exchange or replace worn-out granular material, the slider 4 is shifted to expose the opening 3a so that the granular material 9 may flow into the collector 10.

Displacement of the slider 4 can be obtained by any suitable means. Preferably, this is done manually by simply pulling out the slider 4 from the front i.e. from left in FIG. 1. A suitable grip portion 4b is centrally arranged at the slider 4 to facilitate shifting of the latter. Since the slider 4 usually sits very tightly when being in its closed position, a small pressure medium operated cylinder 10 acts on the slider 4 to allow at least a slight shift of the slider 4 into its opening direction i.e. toward the left in FIG. 1. Then, the slider 4 can easily be manually pulled out.

Fixed to the upper side of the underframe 1 at a lateral distance to the container 2 is a pair of spaced U-shaped vertical supports 15 the upper ends of which are connected by a crossbar 16. Each support 15 is provided with a guide column or guide bar 17. Running along the guide bars 17 via suitable guide bushes 18 is a clamping device which is generally designated by reference numeral 19. The clamping device 19 includes a top housing 19a which accommodates a reversible electromotor 20 with subsequent worm gearing 22. Connected to the worm gearing 22 is a chuck 23 disposed outside the housing 19a coaxially with the container 2 and suitably designed to grasp the rotating parts of plastics processing machines. In the nonlimiting example of FIGS. 1 and 2, the chuck 23 clamps one end of an extrusion screw 24 which for ease of illustration is not shown in FIG. 2. Reference numeral 21 designates the connection cable of the electromotor 20.

Extending centrally between the pair of supports 15 and acting on the underside of the housing 19a of the clamping device 19 is a piston rod 23 which projects through a suitable passage in the underframe 1 into the double-acting cylinder unit 26. The cylinder unit 26 is arranged parallel at a distance to the container 2 and is supported by the underframe 1 in upright position. Through suitable connections 27, 28 pressure medium is alternatingly admitted into the cylinder unit 26 so that the clamping device 19 is movable upwardly and downwardly along the guide bars 17 via the piston rod 23.

It should be noted that it is certainly feasible to use suitable means for providing the upward and downward movement of the clamping device 19 other than the described piston/cylinder unit 26. For example the use of a threaded spindle would serve the same purpose.

After having described the individual parts of the cleaning apparatus according to the present invention, the following sets forth the mode of operation thereof.

Granular material 9 is introduced through the opening 3 into the container 2 up to a suitable height and the heating unit (heating tube 5) is switched on. After reaching a predetermined temperature which is controlled by a not shown thermostat, the electromotor 20 is started and rotates in a direction in accordance with the pitch of the helical line of the screw extruder 24. The worm gearing 22 reduces the rotational speed of the electromotor 20 to e.g. 40 to 60 rpm. Then, the cylinder unit 26 is acted upon by pressure medium admitted through connection 27 so that the piston rod 23 and housing 19a are slowly lowered e.g. by a speed of 1 m/min. After completely immersing at least the portion of the extrusion screw 24 contaminated with synthetic residues within the granular material 9 in the container 2, the downward movement of the clamping device 19 is stopped while the chuck 23 continues to rotate the extrusion screw 24. A timer determines the appropriate period for cleaning the extrusion screw. After elapsing of that cleaning period, the rotational direction of the electromotor 20 is reversed in order to facilitate subsequent removal of the extrusion screw 24 from the container 2, and simultaneously pressure medium is admitted through connection 28 to reciprocate the movement of the piston rod 23. Thus, the piston rod 23 and the clamping device 19 is slowly moved upwards until the latter reaches its upper end position. Simultaneously, the heating unit is turned off to close the cleaning cycle.

As already stated, the temperature up to which the granular material 9 may be heated depends on the properties of the synthetic residues to be removed. The following sets forth some examples with regard to the temperature of the granular material for certain plastic materials:

| Plastic material | Temperature of granular material |
|---|---|
| PVC hard | about 217° C. |
| PA | about 290° to 300° C. |
| ABS | 300° C. |
| PC | about 320° to 340° C. |

The stated temperatures or temperature ranges should not be exceeded in order to prevent a decomposition of the plastic material. It should further be noted that it is not necessary for the adjusted temperature to reach the melting point of the respective synthetic material. The duration of the actual cleaning process depends within certain limits on the shape of the part to be cleaned, its width and on the degree of contamination. For example, the cleaning period is about 10 minutes when cleaning an extrusion screw with a diameter of 20 mm and heavily covered with PVC.

While the invention has been illustrated and described as embodied in an Apparatus for and Method of Cleaning Rotating Parts of Plastics Processing Machines, it is not intended to be limited to the details shown since various modifications and structural changes may be made without departing in any way from the spirit of the present invention.

What is cleaned as new and desired to be protected by Letters Patent is set forth in the appended claims:

1. Apparatus for cleaning rotating parts of plastics processing machines from synthetic residues, comprising:
    a heatable container defining an axis and containing dry filling material, said container having one axial opening for allowing introduction of the part to be cleaned;
    clamping means for holding the part in coaxial alignment with said container;
    first driving means for rotating said clamping means; and
    second driving means cooperating with said clamping means for moving the latter in direction of said axis to allow introduction and removal of said part into and from said container.

2. Apparatus as defined in claim 1 wherein said container is tubular and stationarily supported in an upright position, said clamping means being arranged above said container.

3. Apparatus as defined in claim 1, and further comprising electric heating means surrounding said container for heating the filling material within said container to a predetermined temperature.

4. Apparatus as defined in claim 3 wherein said heating means includes a heating tube concentrically surrounding said container, a heating spiral embedded in said heating tube and a heat insulation enclosing said heating tube.

5. Apparatus as defined in claim 4 wherein said heat insulation is rock wool.

6. Apparatus as defined in claim 1, and further comprising supporting means for guiding said clamping means in direction of said axis, said supporting means including a plurality of vertical guide bars.

7. Apparatus as defined in claim 1 wherein said first driving means includes a reversible electromotor and a worm gearing cooperating with the latter, said clamping means being in connection with said electromotor via said worm gearing.

8. Apparatus as defined in claim 1 wherein said second driving means includes a double-acting cylinder unit with a reciprocating piston rod which acts on said clamping means for moving the latter upwardly and downwardly.

9. Apparatus as defined in claim 6 wherein said clamping means includes a housing accommodating said first driving means and a clamping chuck connected to said first driving means, said housing being provided with guide bushes adapted to run along said guide bars.

10. Apparatus as defined in claim 1 wherein said opening is funnel-shaped for facilitating introduction of the part to be cleaned.

11. Apparatus as defined in claim 1 wherein said container is provided at its other axial end with a further opening for allowing filling material to be discharged.

12. Apparatus as defined in claim 11, and further comprising a collector subjacent to said further opening for accumulating discharged filling material.

13. Apparatus as defined in claim 12 wherein said container has a bottom, and further comprising a slider extending between said further opening and said collector for defining said bottom.

14. Apparatus as defined in claim 13 wherein said slider is provided with a sieve-like perforation in the area of said further opening for allowing dusty material to be continuously discharged from said container into said collector.

15. Apparatus as defined in claim 1 wherein said filling material is of powdery texture.

16. Apparatus as defined in claim 1 wherein said filling material is of granular texture.

17. Apparatus as defined in claim 16 wherein said filling material is a granular mixture of hardened gypsum and hardened mortar.

18. Apparatus as defined in claim 16 wherein said filling material is made of pumice granulates.

19. Apparatus as defined in claim 16 wherein said filling material has a mean graining in the range of 0.5 mm to about 4 mm.

20. Apparatus for removing synthetic residues from rotating parts of plastics processing machines, comprising:
    an underframe;
    an elongated tubular container attached in said underframe and defining an axis, said container containing dry filling material and having one axial opening for allowing introduction of the part to be cleaned;
    a heating unit surrounding said container for heating the filling material to a predetermined temperature;
    clamping means for holding the part to be cleaned in coaxial alignment with said container;
    driving means for rotating said clamping means;
    a plurality of vertical guide bars connected with their one end to said underframe for guiding said clamping means in alignment with said axis of said container; and
    a double acting cylinder unit cooperating with said clamping means for moving the latter in direction of said axis, said cylinder unit including a reciprocating piston rod which acts on said clamping means to move the latter in direction of said axis so as to allow introduction and removal of the part into and from said container.

21. A method of cleaning parts of a plastics processing machine from adhering synthetic residues, comprising the steps of:
    heating a dry filling material within a container to an increased temperature without causing decomposition of the synthetic residues;
    immersing a part rotating in one rotational direction within the filling material for a period sufficient to attain a removal of synthetic residues therefrom; and
    removing the cleaned part from the container.

22. A method as defined in claim 20 wherein said immersing step includes introducing the part to be cleaned into the container at a speed of 1 m/min.

23. A method as defined in claim 20 wherein said removing step includes reversing the rotational direction of the cleaned part.

* * * * *